March 12, 1929.  L. WILD ET AL  1,705,433.
MACHINE FOR OPENING AND CLEANING COTTON AND THE LIKE
Filed May 19, 1927  3 Sheets-Sheet 2

L. Wild and F. Quinn
INVENTOR

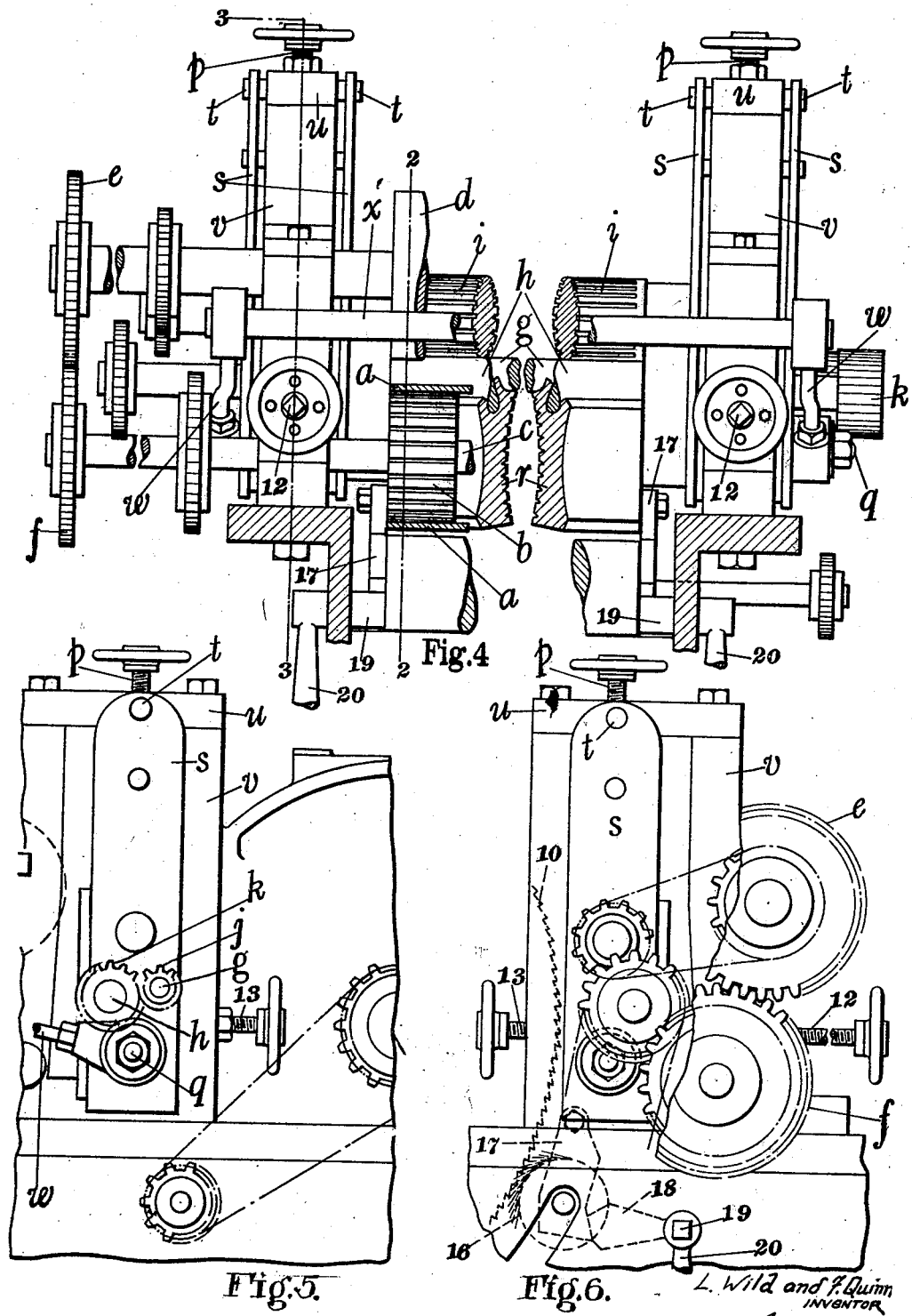

Patented Mar. 12, 1929.

1,705,433

UNITED STATES PATENT OFFICE.

LEONARD WILD AND FRANK QUINN, OF BOLTON, ENGLAND.

MACHINE FOR OPENING AND CLEANING COTTON AND THE LIKE.

Application filed May 19, 1927, Serial No. 192,665, and in Great Britain August 18, 1926.

This invention relates to machines for opening and cleaning cotton and the like, of the type in which the cotton or other fibrous material is subjected to the combing and opening action of a saw tooth roll or cylinder.

The object of the invention is to provide a more efficient feeding device, particularly for short fibred material, ensuring thorough cleaning with a safeguard against damage to the roll saw teeth or the like by pieces of metal or hard substances in the material under treatment.

The invention comprises the mounting of the feed rolls or rollers on a pivotal or yielding frame or carrier which is retained in its normal or operative position relatively to the saw tooth roll or cylinder by springs or equivalent means such as will permit of the automatic recession of the feed rollers for the release of hard pieces of metal or other obstructive substances.

The invention further comprises a feed roller combination for such a yielding frame or carrier including a plurality of lower rolls rotating in troughs or journal seats in a bearing block, the said block having, if desired, a stripping brush or the like arranged therewith for the cleaning of the saw tooth roll or cylinder.

Referring to the two accompanying sheets of explanatory drawings:—

Figure 4 is an end elevation of the feed mechanism.

Figure 5 is a side elevation of part of the machine looking from right to left of Figure 4.

Figure 6 is a side elevation showing part of the side of the machine opposite to that shown in Figure 5.

Figure 1:
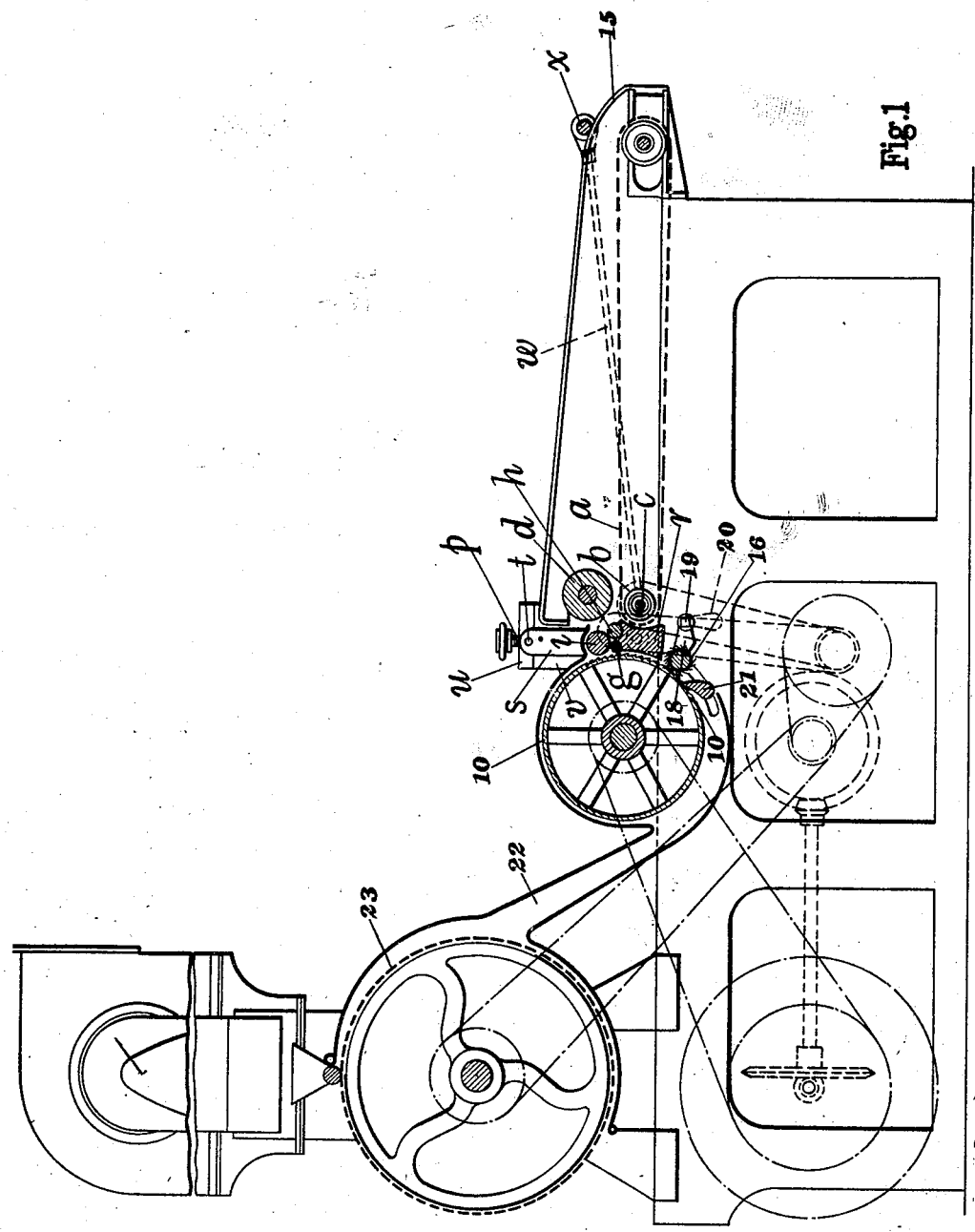
Figure 1 is a side view partly in section illustrating a cotton opening or cleaning machine constructed in one convenient form in accordance with our invention.
Figure 2:
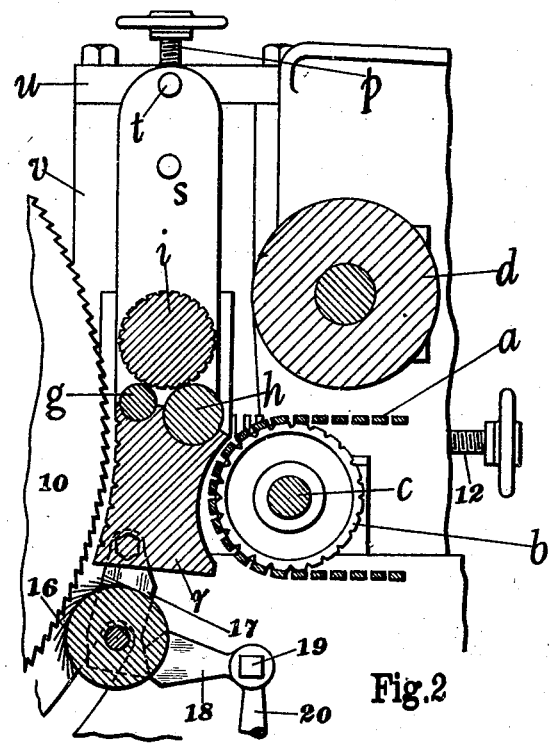
Figure 2 is a detail view drawn to a larger scale of part of the machine illustrated in Figure 1 and is a sectional side elevation on the line 2—2 of Figure 4.

The cotton or other material to be cleaned and opened is placed upon the travelling lattice $a$ which is driven by the rollers $b$ upon the shaft $c$, the latter being chain driven from the power shaft in the base of the machine as shown in Figure 1. Above the lattice is arranged a presser roller $d$ driven by the gear wheels $e$, $f$ from the shaft $c$, which serves to press down the cotton or material as it passes into the machine.

From the lattice $a$ the material passes above the positively driven rollers $g$, $h$ and beneath the roller $i$ which extend across the machine. The roller $i$ is chain driven from the shaft of the roller $d$. The rollers $g$ and $h$ are intergeared by the wheels $j$, $k$, Figure 5, and the roller $h$ is chain driven from the power shaft at the base of the machine (see Figure 1).

The ends of the rollers $g$, $h$ and $i$ are carried in brasses at the opposite sides of the machine, the ends of the roller $i$ being carried in upper brasses $m$ and the ends of the rollers $g$, $h$ in lower brasses $n$. Springs $o$ loaded by screws $p$ hold the upper brasses against the lower brasses so as to resist yieldingly any tendency of the roller $i$ to lift when a thick lump or layer of the cotton or other material passes between such roller and the rollers $g$, $h$.

The trunnion like ends $q$ of the block $r$ are also carried in the lower brasses $n$. Each of the latter is carried by two side plates $s$ suspended by pivot pins $t$ from the top member $u$ of a frame $v$. The securing of the said bottom brass in position may be effected by the nuts on the trunnions upon the block $r$. Arms $w$ fulcrumed on a sleeve upon the said trunnions $q$ are interconnected by a cross member $x$ which extends across the front of the machine as shown in Figure 1, and serves for drawing back the brasses with the feed rollers $g$, $h$, $i$, and block $r$ if any solid material should pass through the feed rollers to the saw tooth roller 10. The block $r$ has troughs or grooves therein as shown in the figures to receive the two rollers $g$, $h$ as shown, the said rollers being in contact with the surface of said grooves across the machine so as to be supported thereby. The side of said block adjacent the saw tooth roll or cylinder 10 is made to a concave shape corresponding with the perimeter of such roll and such concavity may be serrated as shown in the figures.

Figure 3:
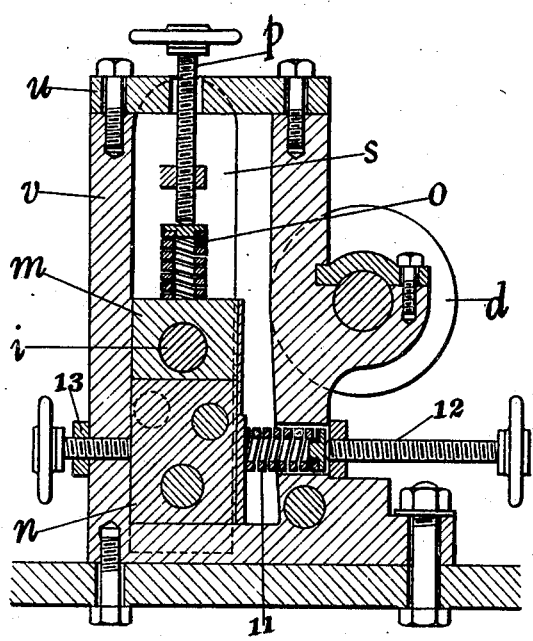
Figure 3 is a sectional side elevation on the line 3—3 of Figure 4.

The brasses $m$, $n$ supported by their pivotal carrier consisting of the side plates $s$ are pressed towards the saw tooth roll 10 by springs 11 loaded by screws 12 (Figure 3) and the movement of the brasses with the parts journalled or secured therein, towards said roll 10 is limited by two adjustable screwed stops 13. It will be seen that with the arrangement described, the feed rollers g, h, i and bearing block r are normally in close proximity to the saw tooth roll or cylinder such as is required for normal working, but the springs 11 permit the said parts to recede automatically and thus increase the space or distance between the block r and the saw tooth roll 10 to permit hard or unyielding substances that may be fed in with the cotton to pass through the said space.

In some cases the bearing block r may be dispensed with but the pivotal arrangement of the feed rollers allows the same to recede if necessary so as to avoid damage to the saw tooth roll or cylinder if solid material is passing through the nip of the feed rollers to said roll or cylinder.

By arranging the cross member x of the means for the hand manipulation of the pivotal carriers of the feed rollers so that it rests upon the curved edge 15 of the machine frame, the said member and connected parts are held automatically in the position to which they are withdrawn with the cross member upon said edge 15.

We may suspend a rotary stripping brush 16 by plates 17 from the bearing block r and provide two cam like parts 18 upon short shafts 19 with handles 20 thereon for engaging said plates and forcing the brush against the saw tooth roll or cylinder for cleaning the surface of the latter. The brush is rotated by a chain 25 (Figure 5) from the cylinder 10 in a direction opposite to that of the cylinder surface.

The saw tooth roll or cylinder 10 rotates at high speed and the material which becomes impaled upon the points of its teeth is caught by the adjustable knife or blade 21 which extends across said roll and is situated at the entrance to the suction chute 22. The dirt in the material is separated by the knife edge of 21 and the cleaned material is drawn by way of the chute 22 on to the cage 23 in the known manner.

What we claim is:—

1. In machines of the type set forth for opening and cleaning cotton and the like, in combination, a high speed saw tooth roll, a blade extending across the said roll, a suction chute extending from said blade for removing the cotton from said roll, a feed lattice, a pivotally mounted frame between said lattice and the saw tooth roll, upper and lower feed rollers mounted in said frame, means for rotating said feed rollers, resilient means pressing the said frame towards the saw tooth roll, and a member extending across the machine and connected to the pivotal frame for the hand manipulation of the same.

2. In machines of the type set forth for opening and cleaning cotton and the like having the combination of parts claimed in claim 1, a block upon the pivotal frame with troughs therein to receive and support the lower feed rollers throughout their length, the face of said block adjacent to the saw tooth roll being made concave to correspond with the perimeter of such roll.

3. In machines of the type set forth for opening and cleaning cotton and the like having the combination of parts claimed in claim 1, a block upon the pivotal frame with troughs therein to receive and support the lower feed rollers throughout their length, a positively driven rotary stripping brush pivotally suspended from said block, and means for pressing said brush into engagement with the saw tooth roll.

In testimony whereof we have signed our names to this specification.

LEONARD WILD.
FRANK QUINN.